United States Patent

Sasaki et al.

(10) Patent No.: US 9,217,472 B2
(45) Date of Patent: Dec. 22, 2015

(54) SEAL EQUIPPED BEARING ASSEMBLY

(71) Applicant: NTN CORPORATION, Osaka (JP)

(72) Inventors: Katsuaki Sasaki, Shizuoka (JP); Takahiro Wakuda, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/495,447

(22) Filed: Sep. 24, 2014

(65) Prior Publication Data

US 2015/0010256 A1  Jan. 8, 2015

Related U.S. Application Data

(63) Continuation of application No. 12/998,580, filed as application No. PCT/JP2009/005736 on Oct. 29, 2009.

(30) Foreign Application Priority Data

Nov. 6, 2008 (JP) .................................. 2008-285574

(51) Int. Cl.
*F16C 33/76* (2006.01)
*F16C 33/78* (2006.01)
(Continued)

(52) U.S. Cl.
CPC .............. *F16C 33/7826* (2013.01); *F16C 19/06* (2013.01); *F16C 33/586* (2013.01); *F16C 33/726* (2013.01)

(58) Field of Classification Search
CPC .......... F16C 19/04; F16C 19/06; F16C 19/24; F16C 19/26; F16C 33/58; F16C 33/583; F16C 33/586; F16C 33/726; F16C 33/76; F16C 33/7823; F16C 33/7853; F16C 33/7856; F16C 33/7826
See application file for complete search history.

(56) References Cited

U.S. PATENT DOCUMENTS 3,203,740 A   8/1965   Peickii et al.
4,428,629 A   1/1984   Colanzi et al.
(Continued)

FOREIGN PATENT DOCUMENTS

CN   1585864   2/2005
EP   0053334   6/1982
(Continued)

OTHER PUBLICATIONS

Chinese Office Action issued Oct. 31, 2012 in corresponding Chinese Application No. 200980144112.1.
(Continued)

*Primary Examiner* — James Pilkington

(57) ABSTRACT

A seal equipped bearing assembly includes a plurality of rolling elements interposed between opposite raceway surfaces defined in respective raceway rings; a sealing member to seal a bearing space delimited between the raceway rings; and a gap formation facilitating element defined in a seal contact face in the other of the raceway rings, the gap formation facilitating element being a projection provided in a circumferential portion of the seal contact face in the raceway ring. The gap formation facilitating element is configured to render the sealing member to be a non-contact seal or to contact so that the contact pressure is approximately zero when the bearing assembly is in a rotating state. The sealing member is provided with a suction preventing device for preventing the sealing member from being sucked onto the other of the raceway rings.

5 Claims, 6 Drawing Sheets

(51) Int. Cl.
  *F16C 19/06* (2006.01)
  *F16C 33/58* (2006.01)
  *F16C 33/72* (2006.01)

(56) References Cited

U.S. PATENT DOCUMENTS

| | | | |
|---|---|---|---|
| 4,533,265 | A | 8/1985 | Woodbridge |
| 4,854,749 | A | 8/1989 | Kohigashi et al. |
| 7,217,036 | B2 | 5/2007 | Ishiguro et al. |
| 2005/0063626 | A1 | 3/2005 | Ishiguro et al. |
| 2008/0247696 | A1* | 10/2008 | Winkelmann et al. ........ 384/482 |

FOREIGN PATENT DOCUMENTS

| | | |
|---|---|---|
| EP | 1555448 | 7/2005 |
| JP | 2-203017 | 8/1990 |
| JP | 2003-166549 | 6/2003 |
| JP | 2003-287040 | 10/2003 |
| JP | 2005-106078 | 4/2005 |
| JP | 2005-308117 | 11/2005 |
| JP | 2006-144812 | 6/2006 |
| JP | 2007-107588 | 4/2007 |

OTHER PUBLICATIONS

European Office Action mailed Dec. 5, 2013 in corresponding European Application No. 09824566.5.
International Search Report issued Jan. 19, 2010 in PCT/JP2009/005736.
Chinese Office Action issued Mar. 21, 2013 in corresponding Chinese Application No. 200980144112.1.
Japanese Office Action issued Jan. 15, 20113 in corresponding Japanese Application No. 2008-285574.
Extended and Supplementary European Search Report issued Dec. 6, 2012 in corresponding European Patent Application No. 09824566.5.
English Translation of the International Preliminary Report on Patentability mailed Jun. 30, 2011 in corresponding International Patent Application PCT/JP2009/005736.
Webpage from Nihon Parkerizing Co., Ltd. relating to Parker Processing.
Catalog from Parker Kako Co., Ltd. relating to Papro Fric Processing (Metal Surface Treatment With High Frictional Coefficient Non-Lubricant Paint).
U.S. Office Action issued Jun. 13, 2013 in copending U.S. Appl. No. 12/998,580.
U.S. Office Action issued Sep. 5, 2013 in copending U.S. Appl. No. 12/998,580.
U.S. Office Action issued Dec. 9, 2013 in copending U.S. Appl. No. 12/998,580.
U.S. Office Action issued Apr. 15, 2014 in copending U.S. Appl. No. 12/998,580.
U.S. Office Action issued Jul. 9, 2014 in copending U.S. Appl. No. 12/998,580.
U.S. Appl. No. 12/998,580, filed May 5, 2014, Katsuaki Sasaki, NTN Corporation.

* cited by examiner

SEAL EQUIPPED BEARING ASSEMBLY

CROSS-REFERENCE TO RELATED APPLICATIONS

This application is a continuation of U.S. application Ser. No. 12/998,580, filed on May 5, 2011, which claims the benefit under 35 U.S.C. Section 371, of PCT International Application No. PCT/JP2009/005736, filed Oct. 29, 2009, which claims priority to Japanese Application No. 2008-285574 filed Nov. 6, 2008, in the Japanese Patent Office, the disclosures of which are hereby incorporated by reference.

BACKGROUND

1. Field

The present invention relates to a seal equipped bearing assembly for use in a transmission of a type used in automotive vehicles.

2. Description of the Related Art

The transmission used in automotive vehicles generally contains foreign matter such as wear debris resulting from gears employed therein. For this reason, prior art bearing units employed in the automobile transmission are each generally employed in the form of a seal equipped bearing unit of a kind utilizing a contact type sealing member used to seal each of the opposite open ends of an annular bearing space delimited between inner and outer rings of the respective bearing unit, to thereby prevent ingress of the foreign matter into each of the bearing units.

Where the annular bearing space is sealed at its opposite open ends with the respective contact type sealing members, an undesirable ingress of the foreign matter can be successfully prevented, but the sealing torque (i.e., the torque, which tends to occur when each of the sealing members slidingly contacts the bearing rotatable ring and which constitutes a resistance to the rotation of the bearing unit) is considerably high enough to bring about a mechanical loss of the driving torque, and this tends to pose a problem in reduction in fuel consumption of the automotive vehicle.

In the seal equipped bearing unit of the kind discussed above, it has been suggested to reduce the sealing torque (in, for example, Japanese Patent Publication No. 2007-107588 discussed below) by effecting a shot peening a surface of one or more sealing lips of each of the sealing member, for example, an inner wall surface of a seal groove defined in the bearing rotatable ring, to render the contact surface to have a surface roughness not larger than 2.5 μm at the maximum height of irregularities Ry.

According to the reduction of the surface roughness of the contact surface to thereby reduce the sealing torque such as employed in the seal equipped bearing unit disclosed in Japanese Patent Publication No. 2007-107588, the extent to which the torque is reduced is limited and no satisfactory effect of reducing the torque can be obtained. Although the use of a non-contact seal will be effective to reduce the sealing torque to zero, reduction in size of the seal gap to such an extent that the undesirable ingress of the foreign matter such as, for example, wear debris resulting from the transmission gears can be prevented will be difficult to achieve because of an error in assemblage, an error in processing, difference in thermal expansion and some other factors.

SUMMARY OF THE INVENTION

An object of the present invention is to provide a seal equipped bearing assembly, which is effective to assuredly avoid an undesirable ingress of foreign matter into the bearing assembly and also to achieve a sufficient reduction of the sealing torque soon after the start of use of the bearing assembly.

The seal equipped bearing assembly according to the present invention is a seal equipped bearing assembly including a plurality of rolling elements interposed between opposite raceway surfaces defined in respective raceway rings and a sealing member for sealing a bearing space delimited between the raceway rings referred to above, which is characterized in that the sealing member is a contact seal, which has a base end secured to one of the raceway rings and also has a sealing lip held in sliding contact with the other of the raceway rings, and in that a gap formation facilitating element (friction facilitation treated element) is defined in a seal contact face of such other of the raceway rings, with which the sealing lip contacts, the gap formation facilitating element being, when used under a condition of the bearing assembly being rotated, operable to render the sealing member to be a non-contact seal or to contact so lightly that the contact pressure can assume zero.

According to the foregoing construction, since the gap formation facilitating element for facilitating a wear of a forefront portion of the sealing lip is provided in the sealing face of the raceway ring with which the sealing lip contacts slidingly, the sealing member, which is the contact type at the initial stage of operation is converted into the sealing member of a non-contact type soon after the start of operation as a result of a sliding contact with the gap formation facilitating element. Or, by the effect of a frictional wear referred to above, a light contact under a contact pressure sufficient to be regarded as zero will occur. For this reason, soon after the start of use, the sealing torque can be reduced sufficiently. By way of example, within a few minutes subsequent to the start of operation, non-contact or the light contact under a contact pressure that can be regarded as zero occurs. As a result, reduction in temperature rise of the bearing assembly can be accomplished and a lubricant oil having a viscosity further lower than that hitherto employed can be selected. Particularly where it is used in a transmission for use in automotive vehicle, it can contribute to reduction in fuel consumption of the automotive vehicle.

Also, since by the effect of the frictional wear referred to above, a minute gap, which defines an optimum labyrinth seal gap, can be formed between the sealing lip of the sealing member and the sealing groove of the raceway ring, an undesirable ingress of foreign matter of a particle size large enough to affect the bearing service life can be avoided while the lubricant oil can pass. As a result, an assured prevention of ingress of the foreign matter into the bearing assembly and a sufficient reduction of the sealing torque can be achieved easily.

In the practice of the present invention, the raceway ring having the seal contact face is a rotatable raceway ring and a seal groove may be defined in the rotatable raceway ring and may have an inner surface which defines the seal contact face. The provision of the sealing groove to allow the sealing lip to contact within this sealing groove is effective to enhance a sealing effect. For this reason, even when it becomes a non-contact seal as a result of frictional wear of the sealing lip, an assured sealability can be secured.

In the practice of the present invention, the gap formation facilitating element may be a minute projection provided in a circumferential portion of a sealing face in the raceway ring, with which the sealing lip contacts. Given the minute projection, a processing to provide the gap formation facilitating element can be accomplished easily. Also, since the projection is minute, it is possible to avoid an undesirable ingress of the foreign matter which would result from floatation of the sealing lip.

In the practice of the present invention, the gap formation facilitating element may be a high friction paint applied area provided in a sealing face in the raceway ring, with which the sealing lip contact. Given the high friction paint applied area, the sealing lip can be caused to contact uniformly over the entire circumference and, therefore, the frictional wear of the sealing lip occurs stably and a process to form the gap formation facilitating element can be accomplished easily.

In the practice of the present invention, the sealing member may be provided with a suction preventing device for preventing the sealing member from being sucked onto such other of the raceway rings. Also, the sealing lip may be provided with a slit communicated inside and outside of the sealing lip. This slit can be rendered to function as the suction preventing device.

Where the sealing member of the contact type is employed, it may occur that by the effect of a reduction in pressure inside the bearing assembly, the sealing member is sucked onto the raceway ring, resulting in increase of the torque. In the present invention, although the gap formation facilitating element is employed, the suction occurs in a manner similar to the standard contact seal by the time the sealing member wears frictionally. Also, even after it assumes the non-contact seal, it may assume a contact state when the suction occurs. The provision of the suction preventing device such as, for example, the slit is effective to avoid such suction and the increase of the torque can be avoided. Where the slit referred to above is employed, air inside the bearing assembly is vented to the atmosphere and, therefore, the reduction in pressure inside the bearing assembly can be relieved and the suction is avoided to thereby avoid the increase of the torque.

In the practice of the present invention, the seal contact face may be an inclined face inclined relative to a radial direction of the raceway rings, in which case the sealing lip is shaped to represent a shape allowing the sealing lip to be engaged in an axial direction with the seal contact face, defined by this inclined face. To make it an axial contact, it is easy to reduce the contact pressure at the time of contact.

Also, the sealing lip may be shaped to represent a shape allowing the sealing lip to be engaged in an radial direction with the seal contact face. To make it a radial contact, even when the pressure inside the bearing assembly becomes negative after the frictional wear done to a non-contact state, suction of the sealing lip can be eliminated or minimized.

Where the minute projection referred to above is employed, and if the sealing lip is so shaped as to represent a shape allowing the sealing lip to be engaged in the axial direction with the seal contact face, such minute projection has to be provided in the seal contact face that defines the inclined face. On the other hand, where the minute projection referred to above is employed, and if the sealing lip is so shaped as to represent a shape allowing the sealing lip to be engaged in the radial direction with the seal contact face, such minute projection has to be provided in the seal contact face that defines, for example, a cylindrical face thereof.

Where the slit referred to above is employed, and if the sealing lip is so shaped as to represent a shape allowing the sealing lip to be engaged in the axial direction with the seal contact face, such slit has to be provided along the seal contact face, which defines the inclined face, so as to permit the space inside the bearing assembly to be communicated inside and outside through such slit. On the other hand, where the slit referred to above is employed, and if the sealing lip is so shaped as to represent a shape allowing the sealing lip to be engaged in the radial direction with the seal contact face, such slit has to be provided along the seal contact face, which defines, for example, the cylindrical face, so as to permit the space inside the bearing assembly to be communicated inside and outside through such slit.

The seal equipped bearing assembly of the present invention may be used as a bearing assembly for a transmission, which is used to support a drive transmitting shaft of the transmission for use in automotive vehicles. The drive transmitting shaft may be any one of an input shaft, an output shaft and an intermediate transmission shaft.

The bearing assembly for use in automobile transmissions is strongly required to be so configured as to ensure an assured prevention of ingress of foreign matter into the bearing assembly and, also, a reduction of the sealing torque and, therefore, effects of the present invention can be effectively exhibited.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE PREFERRED EMBODIMENTS

Figure 1A:
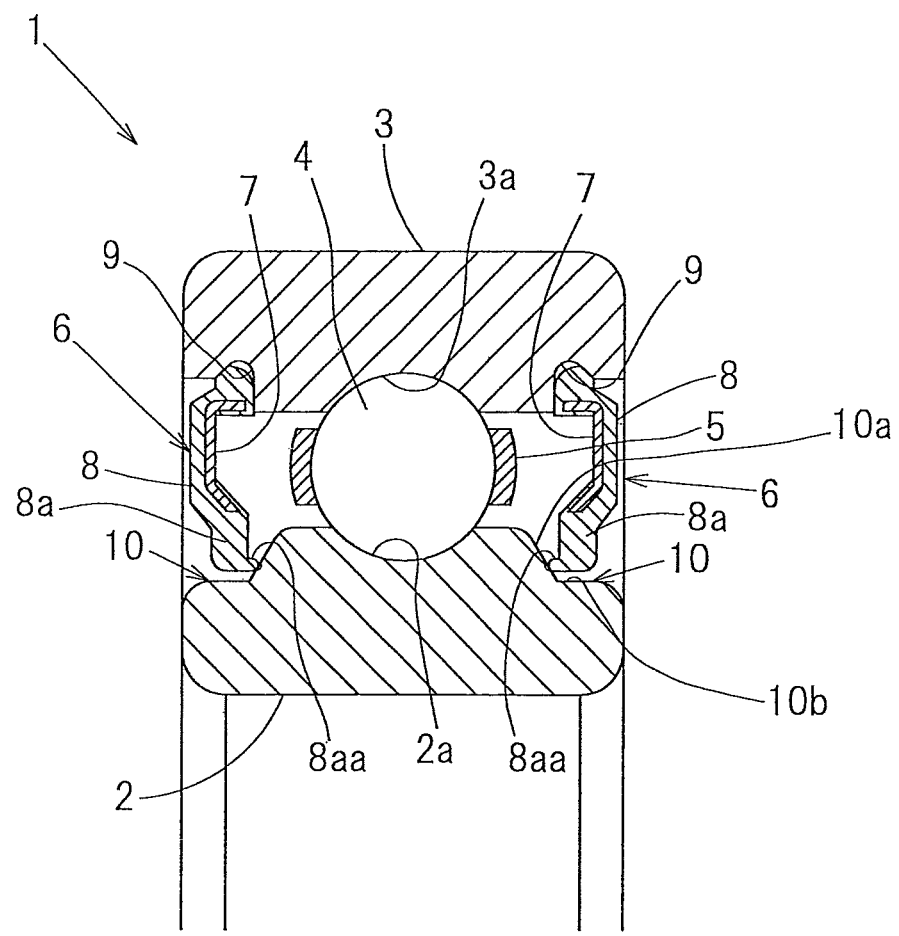
FIG. 1A is a sectional view showing a seal equipped bearing assembly according to a first preferred embodiment of the present invention.
Figure 1B:
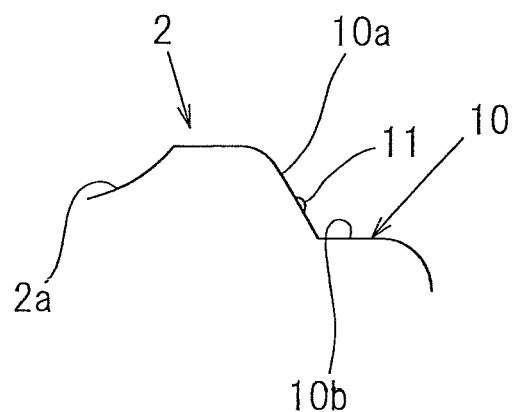
FIG. 1B is a fragmentary enlarged view of a portion of FIG. 1A.

A first preferred embodiment of the present invention will be described in detail with particular reference to FIGS. 1A and 1B to FIG. 5. The seal equipped bearing assembly 1 according to the first embodiment is a rolling bearing assembly that is used in a transmission for an automotive vehicle and includes a plurality of rolling elements 4 interposed between raceway surfaces 2a and 3a defined in an inner ring 2 and an outer ring 3, respectively, a retainer 5 for retaining those rolling elements 4, and a sealing member 6 for sealing each of the opposite ends of an annular bearing space delimited between the inner and outer rings 2 and 3. The inner ring 2 and the outer ring 3 form a pair of raceway rings referred to in the appended claims. A grease is initially filled in the bearing assembly. This rolling bearing assembly is a deep groove ball bearing, in which the rolling elements 4 are employed in the form of balls, and is of an inner ring rotating type, in which the inner ring 2 is used as a rotatable ring and the outer ring 3 is used as a stationary ring.

The sealing member 6 is made up of an annular core metal 7 and an elastic member 8 made of a rubber or resin material or the like secured integrally to the core metal 7 and has an outer peripheral portion thereof fixedly engaged in a seal mounting groove 9 defined in an inner peripheral surface of the outer ring 3 that serves as the stationary ring. The sealing member 6 in its entirety is formed by molding and vulcanizing the rubber material to the core metal 7.

The inner ring 2 that serves as the rotatable ring has a seal groove 10 in the form of a circumferentially extending groove at a location corresponding to an inner peripheral portion of each of the sealing members 6. The seal groove 10 is, in the instance as shown, of a sectional shape including a sealing face 10a, which is rendered to be an inclined face inclined downwardly from a shoulder of the raceway surface 2a, and a groove bottom face 10b in the form of a cylindrical face continued from an inner peripheral edge of the sealing face 10a to an inner ring end face. It is to be noted that although not shown, the seal groove 10 may be of a U-sectioned configuration and may have opposite peripheral faces, each continued to each of the opposite sides of the groove of the U-sectioned configuration or the like, which have respective diameters that are different from each other.

Figure 3A:
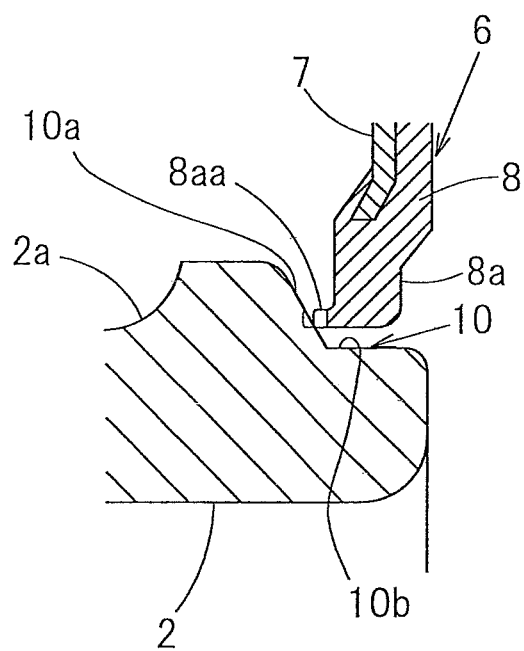
FIG. 3A is a fragmentary enlarged sectional view showing a seal member contact area in the seal equipped bearing assembly.

The sealing member 6 is formed with a sealing lip 8aa formed in a forefront portion of an elastic member inner peripheral portion 8a, which extends radially inwardly from the core metal 7 of the elastic member 8. This sealing lip 8aa has a forefront portion is held in sliding engagement with the sealing face 10a of the seal groove 10 in the inner ring 1. In the first embodiment of the present invention, the sealing lip 8aa extends inwardly of the bearing assembly as shown in FIG. 3A and is held in engagement in an axial direction with the sealing face 10a that is defined by the inclined face forming an inner wall face of the seal groove 10. The sealing lip 8aa has a wall thickness that is not bigger than half of, for example, ¼ of the wall thickness of the elastic member inner peripheral portion 8a.

Figure 2:
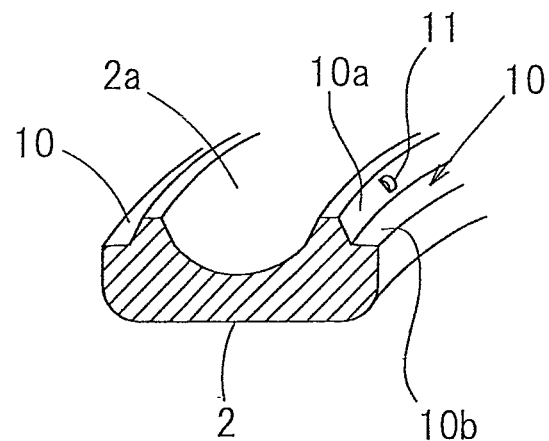
FIG. 2 is a fragmentary perspective view showing an inner ring employed in the seal equipped bearing assembly.

As best shown in FIG. 2, a circumferential portion of the sealing face 10a of the inner ring 2, that is within the width or radial range over which the sealing lip 8aa is slidingly engaged, is formed with a minute projection 11 that defines a gap formation facilitating element capable of facilitating frictional wear of the forefront portion of the sealing lip 8aa. This minute projection 11 may be provided in a plural number and distributed at even intervals over the entire circumference of the inner ring 2 or provided at one location. This minute projection 11 has a height so chosen as to be smaller than the particle size of foreign matter which, when intruding inside the bearing assembly, will affect the service life of the bearing assembly.

Figure 3B:
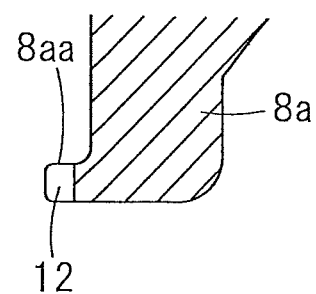
FIG. 3B is a fragmentary enlarged sectional view showing the seal member.

Also, the forefront portion of the sealing lip 8aa of the sealing member 6 is, as shown in an enlarged sectional view in FIG. 3B, provided with a slit 12 for ventilation purpose. This slit 12 may be provided at one location or a plurality of locations in the circumferential direction thereof. This slit 12 will serve as a suction preventing device for the sealing lip 8bb and allows the space inside the bearing assembly to be communicated inside and outside while the sealing lip 8aa is held in contact with the sealing face 10a. The phenomenon, in which the sealing member 6 is sucked towards the inner ring 2 by the effect of a reduction in internal pressure incident to operation of the bearing assembly, is prevented by the ventilation accomplished by the slit 12.

According to the seal equipped bearing assembly 1 of the construction described hereinabove, since the minute projection 11 as the gap formation facilitating element for facilitating the frictional wear of the forefront portion of the sealing lip 8aa is provided in the sealing face 10a of the inner ring 2 with which the sealing lip 8aa of the sealing member 6 is slidingly engaged, the sealing member 6, which is the contact type in the initial stage of operation of the bearing assembly, can become the non-contact type soon after the start of operation of the bearing assembly, for example, a few minutes subsequent to the start of operation of the bearing assembly as a result of sliding engagement of the forefront portion of the sealing lip 8aa with the sealing face 10a and, therefore, the sealing torque can be reduced sufficiently.

Accordingly, a sufficient reduction of the sealing torque can be accomplished. As a result thereof, it is possible to reduce the temperature increase of the bearing assembly and, hence, a lubricant oil of a viscosity further lower than that of the lubricant oil hitherto used can be selected. Particularly where it is applied in a transmission used in automotive vehicles, it is expected to contribute to the reduction in fuel consumption of the automotive vehicle.

Also, since by the above described frictional wear a minute gap, which forms an optimum labyrinth seal gap, is formed between the sealing lip 8aa of the sealing member 6 and the seal groove 10 in the inner ring 2, an undesirable intrusion of foreign matter of a particle size large enough to affect the bearing service life can be prevented although the lubricant oil can pass therethrough. Since while the minute projection 11, which will form the gap formation facilitating element, is provided in the seal groove 10, the minute projection 11 has a height so chosen as to be smaller than the particle size of the foreign matter, which will affect the bearing service life, it will not constitute a cause of intrusion of the foreign matter into the bearing assembly.

Figure 4:
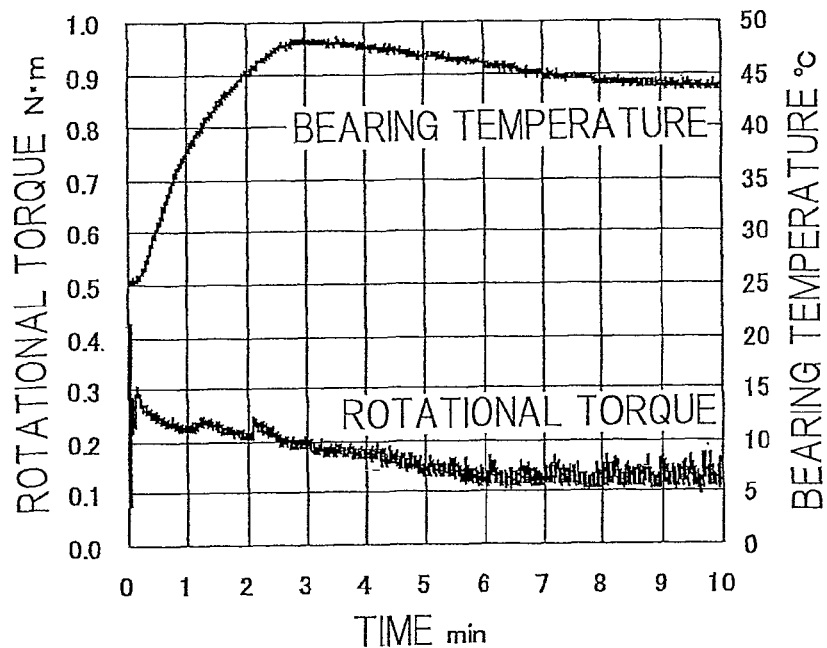
FIG. 4 is a chart showing changes of the rotational torque of the seal equipped bearing assembly and the bearing temperature with time.
Figure 5:
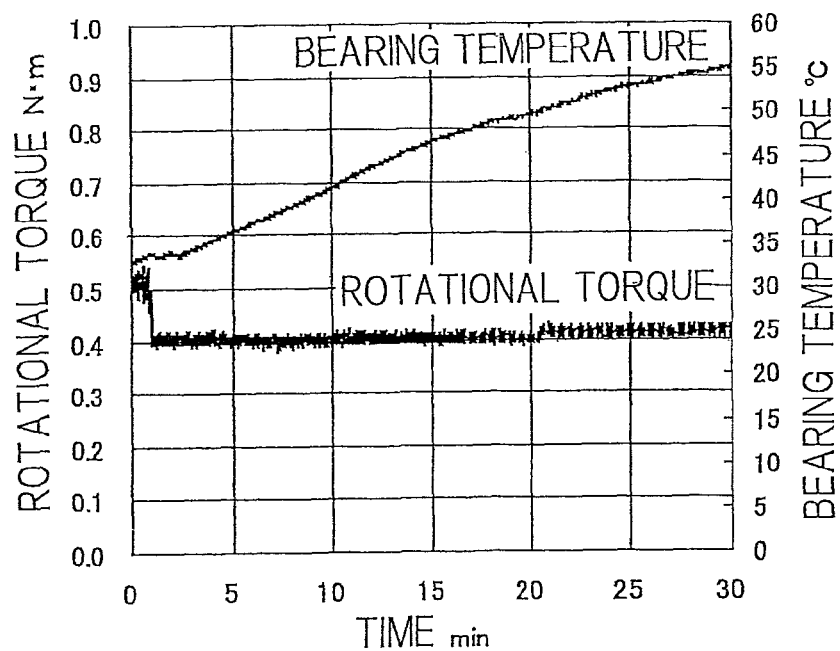
FIG. 5 is a chart showing changes of the rotational torque of the seal equipped bearing assembly and the bearing temperature with time that is exhibited by the conventional product.

FIG. 4 illustrates a chart showing changes of the rotational torque (the torque necessary to rotate the bearing assembly) of the seal equipped bearing assembly 1 according to the above described first embodiment and the bearing temperature (outer ring temperature) with time, while FIG. 5 illustrates a chart showing changes of the rotational torque of the seal equipped bearing assembly and the bearing temperature with time that is exhibited by the conventional product, shown for the purpose comparison. Referring to FIGS. 4 and 5, the graph shown in a lower portion of the chart represents the rotational torque whereas the graph shown in an upper portion of the chart represents the bearing temperature. As shown in FIG. 4, as compared with the conventional product, since in the seal equipped bearing assembly 1 according to the above described first embodiment of the present invention, the forefront portion of the sealing lip 8aa is frictionally worn out a few minutes subsequent to the start of operation of the bearing assembly to thereby form the optimum labyrinth gap, the sealing torque, which has occupies a large proportion of the bearing torque (torque that forms the resistance to rotation of the bearing assembly), can be eliminated and, therefore, the rotational torque is reduced considerably. Also, incident thereto, temperature self-increase of the bearing assembly is lowered.

In addition, since in the above described first embodiment, the forefront portion of the sealing lip 8aa of the sealing member 6 is provided with the ventilating slit 12 defining the suction preventing device in order to prevent the sealing member 6 from being sucked onto the inner ring 1 which would occur as a result of reduction in internal pressure of the bearing assembly, the possibility that after the sealing member 6 then worn out has become the non-contact seal, the sealing member 6 is sucked onto the seal groove 10 in the inner ring 2 to assume a contact seal by the effect of the reduction in internal pressure of the bearing assembly or the possibility that the sealing member 6 is strongly sucked onto the seal groove 10 by the time the sealing member 6 is worn out can be prevented and, therefore, an undesirable increase of the torque resulting from the suction can be avoided.

Figure 6:
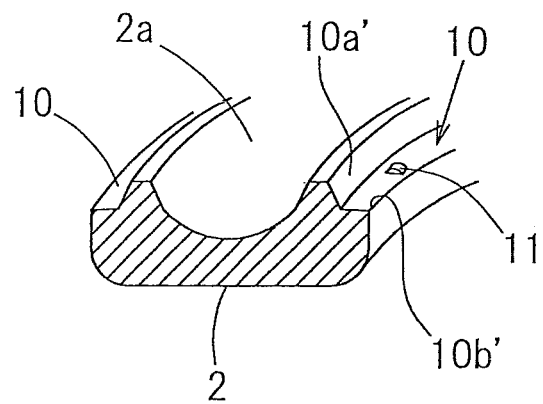
FIG. 6 is a fragmentary perspective view showing the inner ring employed in the seal equipped bearing assembly according to a second preferred embodiment of the present invention.
Figure 7A:
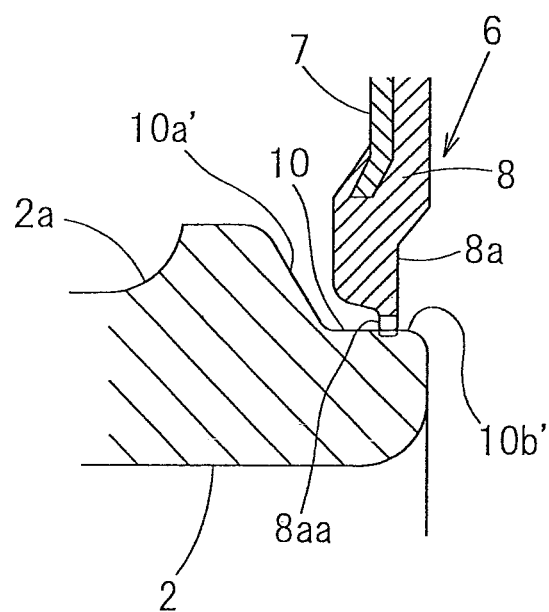
FIG. 7A is a fragmentary enlarged sectional view showing the seal member contact area in the seal equipped bearing assembly.
Figure 7B:
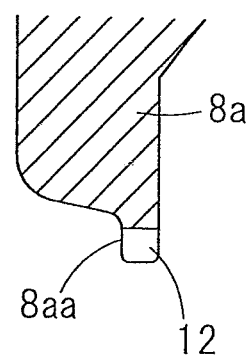
FIG. 7B is a fragmentary enlarged sectional view showing the seal member.

FIGS. 6, 7A and 7B illustrate a second preferred embodiment of the present invention. In the seal equipped bearing assembly according to the second embodiment, unlike that according to the first embodiment shown in and described with reference to FIGS. 1A and 1B to 5, the forefront portion of the sealing lip 8aa of the sealing member 6 is made to extend inwardly and is then held in engagement in a radial direction with a sealing face, which is a groove bottom face 10b' of the seal groove 10 defined in the inner ring 2 as best shown in FIG. 7A. It is to be noted that the sectional shape of the seal groove 10 is the same as that employed in the practice of the first embodiment shown in and described with particular reference to FIGS. 1A and 1B to 5, but the groove bottom face 10b' serves as the sealing face and an inclined face 10a' is rendered to be non-contact.

Also, since in the second embodiment, the groove bottom face 10b' of the seal groove 10 serves as the sealing face with which the forefront portion of the sealing lip 8aa contacts, the minute projection 11 defining the gap formation facilitating element is formed, as shown in FIG. 6, in the sealing face defined by the groove bottom face 10b' of the seal groove 10. Even in this second embodiment of the present invention, as shown in an enlarged sectional view in FIG. 7B, the forefront portion of the sealing lip 8aa of the sealing member 6 is provided with a slit 12 for ventilation purpose, which defines the suction preventing device. Other structural features thereof than those described above are similar to those shown and described in connection with the previously described first embodiment.

Even in this second embodiment of the present invention, prevention of the foreign matter from entering the bearing assembly and sufficient reduction of the sealing torque can be accomplished and, where it is applied in a transmission used in automotive vehicles, it is expected to contribute to the reduction in fuel consumption of the automotive vehicle.

It is to be noted that although in describing each of the foregoing preferred embodiments of the present invention, the use of the minute projection 11 in that circumferential portion of the groove bottom face 10b', which defines the sealing face or the sealing face 10a of the inner ring 2, which defines the rotatable raceway ring, has been shown and exemplified as the gap formation facilitating element operable to facilitate a frictional wear of the forefront portion of the sealing lip 8aa of the sealing member 6, a high friction paint may be applied to the groove bottom face 10b', which defines the sealing face or the sealing face 10a referred to above in place of the minute projection 11, to thereby form a high friction paint applied area. In such case, for the high friction paint, a Parker Processing may be enumerated. The Parker Processing referred to above is one of surface treatments, which is generally called the Papro Fric Processing (Metal Surface Treatment With High Frictional Coefficient Non-Lubricant Paint) provided for by Parker Kako Co., Ltd.

Also, although in describing each of the foregoing embodiments, the elastic member 8 has been shown and described as made of the same material in its entirety, the sealing lip 8aa in its entirety or the forefront portion of the sealing lip 8aa may be made of a material that is easier to wear frictionally than that of any other portion thereof.

Also, although in describing each of the foregoing embodiments, the present invention has been shown and described as applied to the rolling bearing assembly of the inner ring rotating type, the present invention can be equally applied to a rolling bearing assembly of an outer ring rotating type or a thrust bearing assembly and, even in such case, effects similar to those described hereinbefore can be obtained.

Figure 8:
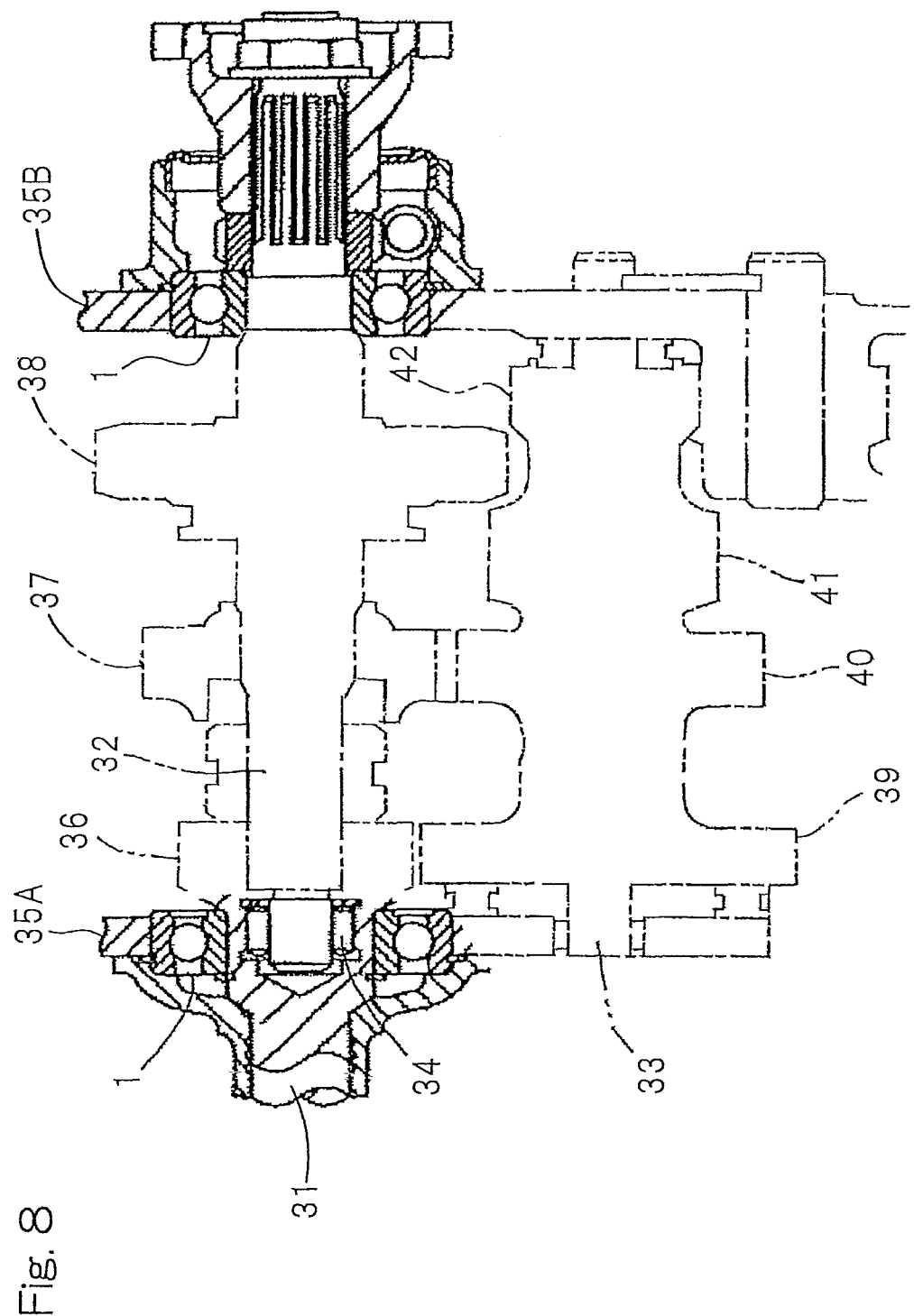
FIG. 8 is a schematic diagram showing one example of a gear system in a transmission for an automotive vehicle, in which the seal equipped bearing assembly of the present invention is incorporated.

FIG. 8 illustrates a schematic diagram showing one example of a gear system employed in the transmission for use in automotive vehicle, in which the seal equipped bearing assembly 1 of the present invention is incorporated. Shown therein is, for example, a manual transmission. An input shaft 31 is rotatably supported by a housing 35A through the seal equipped bearing assembly 1 according to any one of the previously described first and second embodiments of the present invention. An output shaft 32 has one end rotatably supported by an end inner diametric surface of the input shaft 31 through a rolling bearing assembly 34 and also has the opposite end rotatably supported by the housing 35b through the seal equipped bearing assembly 1. A counter shaft 33 having gears 39, 40, 41 and 42 engageable respectively with a gear 36 on the input shaft 31 and gears 37 and 38 on the output shaft 32 is arranged parallel to the output shaft 32 and has its opposite ends rotatably supported by respective housings 35A and 35B.

As hereinabove described, the use of the seal equipped bearing assembly 1 of the present invention in the automobile transmission, prevention of ingress of the foreign matter into the bearing assembly and sufficient reduction of the sealing torque can be accomplished and, hence, it is possible to contribute to the reduction in fuel consumption of the automotive vehicle.

Figure 9:
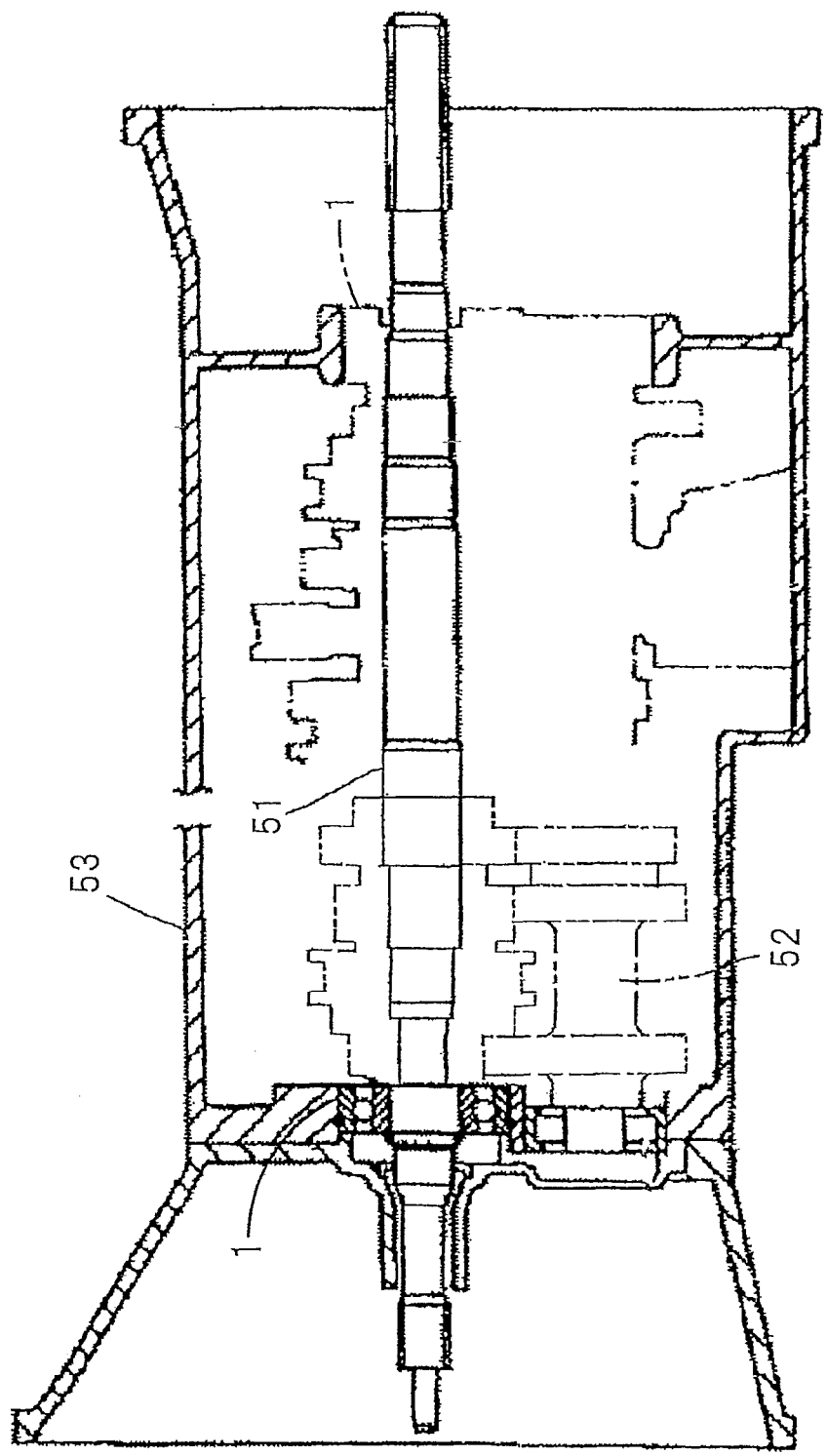
FIG. 9 is a schematic diagram showing another example of a gear system in a transmission for an automotive vehicle, in which the seal equipped bearing assembly of the present invention is incorporated.

FIG. 9 illustrates a schematic diagram showing a different example of a gear system employed in the transmission for use in automotive vehicle, in which the seal equipped bearing assembly 1 of the present invention is incorporated. Shown therein is, for example, an automatic transmission. Opposite ends of a main shaft 51 is rotatably supported by a casing 53 through the seal equipped bearing assembly 1 according to any one of the previously described first and second embodiments of the present invention. A counter shaft 52 having a gear system engageable with a gear system on the main shaft 51 is also rotatably supported by the casing 53 and arranged parallel to the main shaft 51.

Even in this case, since the seal equipped bearing assembly 1 of the present invention is employed in the automobile transmission, prevention of ingress of the foreign matter into the bearing assembly and sufficient reduction of the sealing torque can be accomplished and, hence, it is possible to contribute to the reduction in fuel consumption of the automotive vehicle.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A seal equipped bearing assembly comprising:
a plurality of rolling elements interposed between opposite raceway surfaces defined in respective raceway rings; and
a sealing member to seal a bearing space delimited between the raceway rings, the sealing member having a base end secured to one of raceway rings and a sealing lip held in contact with the other of the raceway rings when the bearing assembly is in a non-rotating state; and
a gap formation facilitating element defined in a seal contact face in the other of the raceway rings, the gap formation facilitating element being a projection provided in a circumferential portion of the seal contact face in the raceway ring,
wherein the gap formation facilitating element is configured to render the sealing member to be a non-contact seal or to contact so that the contact pressure is approximately zero when the bearing assembly is in a rotating state, and
the sealing lip is provided with a slit that connects an inside of the sealing lip to an outside of the sealing lip.

2. The seal equipped bearing assembly as claimed in claim 1, in which the raceway ring having the seal contact face is a rotatable raceway ring and a seal groove is defined in the rotatable raceway ring, the seal groove having an inner surface which defines the seal contact face.

3. The seal equipped bearing assembly as claimed in claim 1, in which the seal contact face is an inclined face inclined relative to a radial direction of the raceway rings and the sealing lip is shaped to represent a shape allowing the sealing lip to be engaged in an axial direction with the seal contact face, defined by the inclined face.

4. The seal equipped bearing assembly as claimed in claim 1, in which the sealing lip is shaped to represent a shape allowing the sealing lip to be engaged in a radial direction with the seal contact face.

5. The seal equipped bearing assembly as claimed in claim 1, which is a bearing assembly for use in an automobile transmission for supporting a drive transmitting shaft in the automobile transmission.

* * * * *